United States Patent
Fees et al.

(10) Patent No.: US 10,673,051 B2
(45) Date of Patent: Jun. 2, 2020

(54) ENERGY STORAGE ARRANGEMENT IN PARTICULAR FOR A MOTOR VEHICLE, MOTOR VEHICLE AND METHOD FOR PRODUCING AN ENERGY STORAGE ARRANGEMENT

(71) Applicant: AUDI AG, Ingolstadt (DE)

(72) Inventors: Heiner Fees, Bietigheim-Bissingen (DE); Ralf Maisch, Abstatt (DE); Torsten Kärcher, Leingarten (DE)

(73) Assignee: AUDI AG, Ingolstadt (DE)

( * ) Notice: Subject to any disclaimer, the term of this patent is extended or adjusted under 35 U.S.C. 154(b) by 115 days.

(21) Appl. No.: 15/235,835

(22) Filed: Aug. 12, 2016

(65) Prior Publication Data

US 2017/0047574 A1    Feb. 16, 2017

(30) Foreign Application Priority Data

Aug. 14, 2015 (DE) .................... 10 2015 215 599

(51) Int. Cl.
*H01M 2/20* (2006.01)

(52) U.S. Cl.
CPC ........ *H01M 2/206* (2013.01); *H01M 2220/20* (2013.01)

(58) Field of Classification Search
CPC ............ H01M 2220/20; H01M 2/206; H01M 2/1016; H01M 2/202; H01M 2/34; H01M 2/1077; H01M 10/63
See application file for complete search history.

(56) References Cited

U.S. PATENT DOCUMENTS

| 8,975,774 B2 | 3/2015 | Kreutzer et al. | |
| 2006/0057460 A1* | 3/2006 | Matthias | H01M 2/105 429/175 |
| 2006/0105624 A1* | 5/2006 | Yoshikane | H01M 2/202 439/500 |

(Continued)

FOREIGN PATENT DOCUMENTS

| CN | 201511214 | * | 7/2010 |
| CN | 201511214 U | * | 7/2010 |

(Continued)

OTHER PUBLICATIONS

Chinese Search Report dated Jun. 1, 2018 with respect to counterpart Chinese patent application 2016106598569.

(Continued)

*Primary Examiner* — Ula C Ruddock
*Assistant Examiner* — Thomas H. Parsons
(74) *Attorney, Agent, or Firm* — Henry M. Feiereisen LLC

(57) ABSTRACT

An energy storage arrangement, includes multiple energy storages, each energy storage having a housing and a terminal connection, wherein the terminal connection lies on an electrostatic potential of a first terminal of the energy storage and is arranged on an end side of the energy storage, wherein the housing lies on an electrostatic potential of a second terminal of the energy storage. The energy storage arrangement further has a first busbar electrically conductively fastened on the terminal connection of each of the energy storages, and a second busbar electrically conductively fastened on the housing on the end side of the energy arrangement on which the first busbar is arranged.

15 Claims, 2 Drawing Sheets

(56) References Cited

U.S. PATENT DOCUMENTS

| | | | |
|---|---|---|---|
| 2011/0206970 A1* | 8/2011 | Itoi | H01M 2/1077 |
| | | | 429/120 |
| 2013/0295437 A1 | 11/2013 | Kreutzer et al. | |
| 2014/0093766 A1 | 4/2014 | Fees et al. | |
| 2014/0255750 A1 | 9/2014 | Jan et al. | |
| 2015/0125722 A1 | 5/2015 | Fees et al. | |
| 2015/0364744 A1 | 12/2015 | Takano et al. | |

FOREIGN PATENT DOCUMENTS

| | | | |
|---|---|---|---|
| CN | 102110841 A | | 6/2011 |
| CN | 103165837 A | | 6/2013 |
| CN | 103582962 A | | 2/2014 |
| CN | 203812584 U | | 9/2014 |
| JP | 2014123433 | * | 7/2014 |
| JP | 2014123433 A | * | 7/2014 |
| WO | WO 2014/119286 A1 | | 8/2014 |

OTHER PUBLICATIONS

Translation of Chinese Search Report dated Jun. 1, 2018 with respect to counter art Chinese atent application 2016106598569.

\* cited by examiner

ENERGY STORAGE ARRANGEMENT IN PARTICULAR FOR A MOTOR VEHICLE, MOTOR VEHICLE AND METHOD FOR PRODUCING AN ENERGY STORAGE ARRANGEMENT

CROSS-REFERENCES TO RELATED APPLICATIONS

This application claims the priority of German Patent Application, Serial No. 10 2015 215 599.4, filed Aug. 14, 2015, pursuant to 35 U.S.C. 119(a)-(d), the content of which is incorporated herein by reference in its entirety as if fully set forth herein.

BACKGROUND OF THE INVENTION

The present invention relates to a The invention relates to an energy storage arrangement.

The following discussion of related art is provided to assist the reader in understanding the advantages of the invention, and is not to be construed as an admission that this related art is prior art to this invention.

The supply of fully or partially electrically driven vehicles requires providing electrical energy from a plurality of energy storages. For this purpose a defined number of energy storages are typically connected in parallel with each other by two busbars and subsequently a plurality of these energy storage arrangements are connected with each other in series to achieve a desired total voltage by adding up the voltages of the energy storage arrangements. For this purpose oftentimes round cells on lithium-ion basis with a substantially cylindrical outer shape are used, which have a terminal connection at an end side, which terminal connection lies on the electrostatic potential of a first terminal, in particular the positive terminal, of the energy storage.

It is known to electrically conductively fasten the first busbar and the second busbar on opposing end sides of multiple parallel-arranged energy storages in order to realize a parallel connection of the energy storages. The fastening is mostly accomplished using bonding methods by which the busbars are connected with the terminal connections.

However, bonding processes have the disadvantage of being very time consuming and the electrical connections are error prone due to the small diameters of the used bonding wires. In addition the electrically conductive fastening of busbars on opposing end sides of cylindrical energy storages requires moving the energy storage arrangement or the bonding tool during the fastening process. The production of conventional energy storage arrangements is therefore technically complicated and time consuming.

It would therefore be desirable and advantageous to provide an improved an energy storage arrangement, which can be produced more cost-effectively.

SUMMARY OF THE INVENTION

According to one aspect of the present invention, an energy storage arrangement includes multiple energy storages, each energy storage having a housing and a terminal connection, wherein the terminal connection lies on an electrostatic potential of a first terminal of the energy storage and is arranged on an end side of the energy storage, wherein the housing lies on an electrostatic potential of a second terminal of the energy storage. The energy storage arrangement further has a first busbar electrically conductively fastened on the terminal connection of each of the energy storages, and a second busbar electrically conductively fastened on the housing on the end side of the energy arrangement on which the first busbar is arranged.

The invention is based on the recognition that the entire housing of an energy storage lies on the potential of its second terminal due to corresponding internal contacting, whereas the first terminal is internally contacted with a terminal connection that is insulated relative to the housing. Typically the first terminal is the positive terminal and the second terminal the negative terminal of the energy storage. Due to this arrangement of housing and terminal connection described above it is provided according to the invention to arrange the first busbar and the second busbar on the same end side of each energy storage. For this purpose the second busbar has an electrically conducting fastening on the housing of each energy storage and the first busbar has an electrically conducting fastening on the terminal connection of each energy storage. Advantageously the energy storages are arranged parallel relative to each other and have the same orientation regarding their terminals. Of course, for avoiding short circuits an electrical insulation is provided between the first and the second busbar. As a result of the arrangement of the first busbar and the second busbar on the same end side, movement of the energy storage arrangement or a fastening tool is no longer required because during production of the energy storage arrangement work only has to be performed on one end side of the energy storages. During the production process manufacturing steps that are required for conventional energy storage arrangements are not required and thus the energy storage arrangement according to the invention can be produced more cost-effectively. Preferably the energy storage arrangement according to the invention is used in motor vehicles and can also be installed in other land vehicles that include users that have to be supplied with current, such as rail bound vehicles, but can also be used in air vessels and space or water vessels. On the other hand stationary applications are also conceivable, such as use as a buffer storage for supply of a low voltage network of a building.

In the energy storage arrangement according to the invention the first busbar is preferably fastened on the terminal connections and/or the second busbar on the housings by means of a welding connection. In particular when compared to convectional energy storage arrangements that have bonded fastenings, this makes it possible to generate a significantly more robust mechanical connection between the first busbar and the terminal connections or the second busbar and the housings. This advantageously avoids a mechanical weak point in the form of bonding wires.

In the energy storage arrangement according to the invention, the housing of each energy storage is particularly preferably configured cup-shaped and has a cover element which includes the terminal connection and closes the housing electrically insulatingly against the terminal connection, wherein the second busbar is fastened on a border region of each housing. It is thus proposed to use energy storages that have a cup-shaped housing, in particular having a cylindrical basic shape, wherein the housing receives a cell coil of a galvanic cell. The cup-shaped housing is hereby closed by means of a cover element that includes the terminal connection, wherein for preventing a short circuit of the first terminal and the second terminal the cover element has an insulating means between the terminal connection and the housing. Such a construction substantially corresponds to energy storages in the form of round cells such as of type 18650. The energy storage arrangement can therefore advantageously be constructed on a solid technological basis. Because in energy storages with a cup-shaped housing and a cover element the cover element closes the housing in its border region the second busbar can be contacted particularly easily at this border region. Moreover, the fact that the border region lies in a plane that is only slightly spaced apart from the terminal connection, also achieves a particularly space-saving arrangement of the first busbar and the second busbar relative to each other.

In the energy storage arrangement according to the invention, in which the second busbar is fastened on a border region of each housing, it is also preferred when the energy storage arrangement has at least one contact element for the fastening on each housing, which contact element at least partially overlaps the border region. This means that on the second busbar a contact element is formed which serves for connection to the border region of the housing. This is particularly advantageous when generating a welding connection because such a contact element can be configured significantly thinner than other sections of the busbar, which are typically configured with a significantly greater material thickness in order to also ensure the transport also of higher current strengths. For this purpose the contact element preferably protrudes from the remaining sections of the second busbar and can be formed integrally as one piece with these sections or can also be fastened as a separate component on these sections and in this way form the second busbar.

For a similarly simplified fastening of the first busbar the first busbar of the energy storage arrangement according to the invention may also have a protruding contact section for each terminal connection to be fastened. Such a contact section can also be formed integrally as one piece on the other sections of the first busbar or can be fastened on these sections as separate component. It is noted that the contact section does not have to be completely fastened on the terminal connection but it is sufficient when it only partially contacts the terminal connection and/or is only partially directly fastened on the terminal connection for example by a welding point that does not completely fill the contact section.

According to another advantageous feature of the invention, the contact sections are offset when viewed in cross section. The contact sections can thus be offset relative to the remaining sections of the first busbar toward the terminal connection which thus enables adjustment of a distance over the width of the offset between a plane in which the terminal connections are arranged and a plane in which the first busbar extends. In this way the dimensions of the first busbar and the second busbar of the energy storage arrangement can advantageously be chosen very flexibly.

According to another advantageous feature of the invention, in the energy storage arrangement according to the invention having contact sections when these contact sections are respectively constructed as a metal tab which is fastened with its free end on the terminal connection and can be deformed for pressing onto the terminal connection. A contact section constructed in this manner can be pressed onto the terminal connection when fastening the contact section to the terminal connection, so that the contact section at least partially rests flat on the terminal connection. This is particularly advantageous when a space between the contact section and the terminal connection is to be avoided during fastening, which is in particular the case when producing the welding connection.

Advantageously, in the energy storage arrangement according to the invention having the contact elements and/or contact sections, the contact elements and/or the contact sections, in particular the metal tabs, are made of steel or nickel. Typically the housings and the terminal connections of the energy storages are made of steel sheet, whereas the first busbar and/or the second busbar preferably have sections made of aluminum. However, connecting these materials to each other by welding is very difficult. On the other hand, the selection of an appropriate material for the contact element and/or the contact sections in particular the metal tabs, nevertheless enables a mechanically particularly stable connection. Hereby it has been found that in particular for producing a welding connection, steel or nickel are appropriate materials for the fastening of the contact elements on the second busbar and/or the contact sections on the first busbar.

A particularly space-saving construction of the energy storage arrangement according to the invention can be achieved when the first busbar and the second busbar are connected layer-like to form a current collector with an insulating layer arranged between them. The current collector can thus be pre-fabricated as sandwich component from the first busbar the second busbar and the insulating layer so that it can be placed on correspondingly positioned energy storages or the energy storages can be inserted into it. This allows further simplifying the production of the energy storage arrangement according to the invention.

According to another advantageous feature of the invention, the first busbar and/or the second busbar have recesses above the end sides of the energy storages. These recesses facilitate the guiding of the fastening tool, in particular a welding tool, on the sides of the first busbar and/or the second busbar to be fastened because these do not overlap due to the provided recesses.

According to another aspect of the invention, a motor vehicle including at least one energy storage arrangement according to the invention.

According to another aspect of the invention, a method for producing an energy storage arrangement according to the invention with a first busbar, a second busbar and multiple energy storages which each have a terminal connection which lies on the electrostatic potential of a first terminal of the energy storage and is arranged on an end side of the energy storage, wherein the first busbar is electrically conductively fastened on the terminal connections, wherein a second busbar is electrically conducingly fastened on the same end sides as the first busbar on a housing that lies on the electrostatic potential of the second terminal.

According to another advantageous feature of the invention, the first busbar can welded on the terminal connections and/or the second busbar on the housings.

According to another advantageous feature of the invention, the second busbar can be fastened on a border region of each housing which is configured cup-shaped and is closed by a cover element which includes the terminal connection and which electrically insulates the terminal connection against the housing.

According to another advantageous feature of the invention, the second busbar has at least one contact element for the fastening on each housing, which contact element is fastened so as to at least partially overlap the border region.

According to another advantageous feature of the invention, the first busbar can have a contact section for each fastening on the energy storages, wherein during performance of the method according to the invention the contact sections are fastened on the terminal connections.

According to another advantageous feature of the invention, the contact sections can be configured as elastically deformable metal tabs, wherein during the fastening the metal tabs are pressed against the respective terminal connections.

According to another advantageous feature of the invention, the first busbar and/or the second busbar can have recesses in the regions that are to be arranged above the end surfaces, wherein the tool provided for the fastening is guided through the recesses for generating the fastening connection.

According to another advantageous feature of the invention, the method according to the invention can also include monitoring the energy storage arrangement by a camera for testing whether the fastenings of the first busbar on the terminal connections and/or the busbar on the housing was successful. This makes it possible to monitor an automated production method particularly easily regarding the quality of the generated fastenings.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
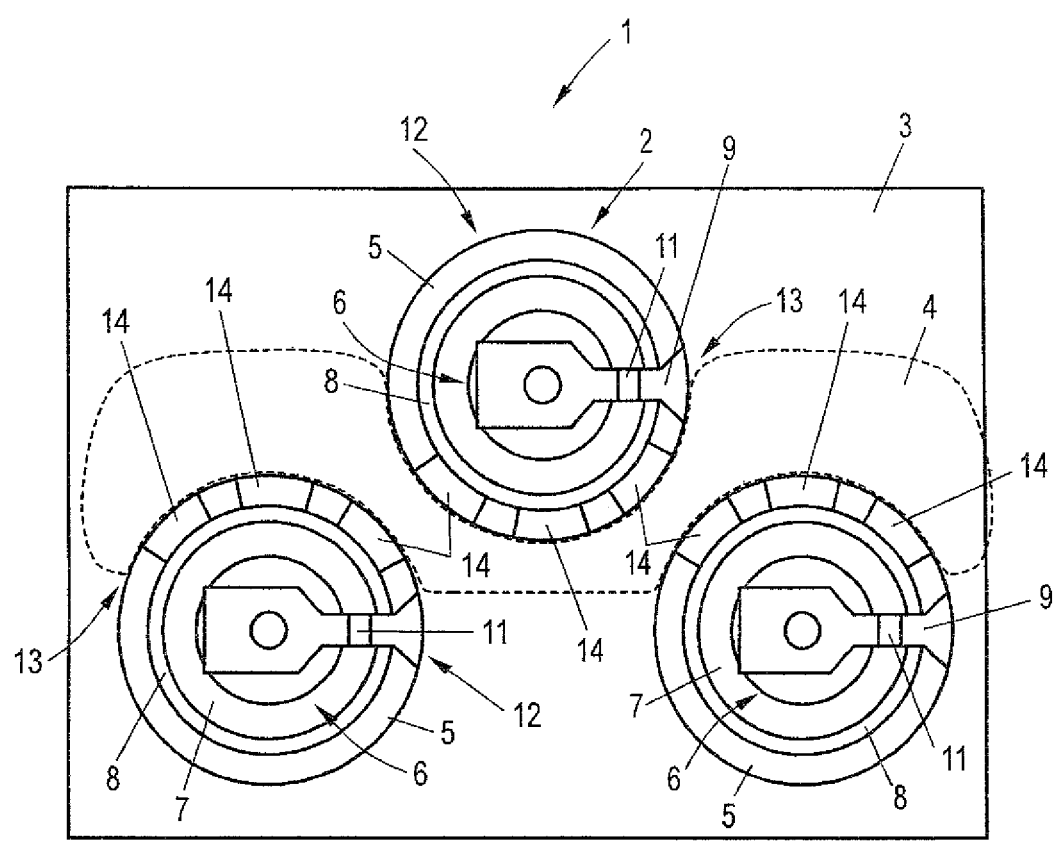
FIG. 1 shows a top view onto the energy storage arrangement.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a top view onto an energy storage arrangement 1 having three energy storages 2, which are arranged offset to each other so as to obtain a highest possible packing density, and a first busbar 3. A second busbar 4 is situated covered below the first busbar 3 and is indicated by dashed lines.

The energy storages 2 are for example round cells with a substantially cylindrical outer shape, which are lithium-ion based and of type 18640. The energy storages 2 each include a cup-shaped housing 5, which is closed by a cover element 6 arranged on an end side. The cover element 6 has a terminal connection 7 and an insulating ring 8, which electrically insulates the terminal connection 7 relative to the housing 5. The terminal connection 6 hereby lies on the electrostatic potential of a first terminal, in the present case the positive terminal, of the energy storage 2 and the housing lies on the potential of a second terminal, in the present case the negative terminal, of the energy storage 2.

For each energy storage 2 a contact section 9, which is configured as a metal sheet, protrudes from the first busbar 3, which contact section 9 is electrically conductively fastened on the terminal connection 7 by means of a welding connection 10. For generating the welding connection 10 in particular a laser welding process is used. The contact section 9 has respectively an offset 11 so that it rests flat in the terminal connection 7 with its free end. The contact sections 9 are in addition configured elastically deformable so that when generating the welding site 10 they can be pressed against the terminal connection 7. As can be seen in FIG. 1 the first busbar 3 has a recess 12 for each energy storage 2 so that the end sides of the energy storages 2 are not covered.

The second busbar 4 also has recesses 13 so that it extends meander like around the offset-arranged energy storages 2. For each energy storage 2 three contact elements 14 are provided which overlap the end side border region of each housing 5 and are welded to, the housing 5. The second busbar 4 thus lies on the electrostatic potential of the negative terminals of the energy storages 2. The contact elements 14 are hereby configured as thin metal sheets and protrude from the remaining sections of the second busbar 4 wherein they overlap the housings 5 in their border regions.

The contact sections 9 and the contact elements 14 are made of steel or nickel or an alloy of these two metals, whereas the first busbar 3 and the second busbar 4 are each made of aluminum. Because welding of aluminum on the housings 5 and terminal connections 7 made of steel is technically complicated the contact sections 9 and the contact elements 14 are made of the mentioned particularly easily weldable materials.

Figure 2:
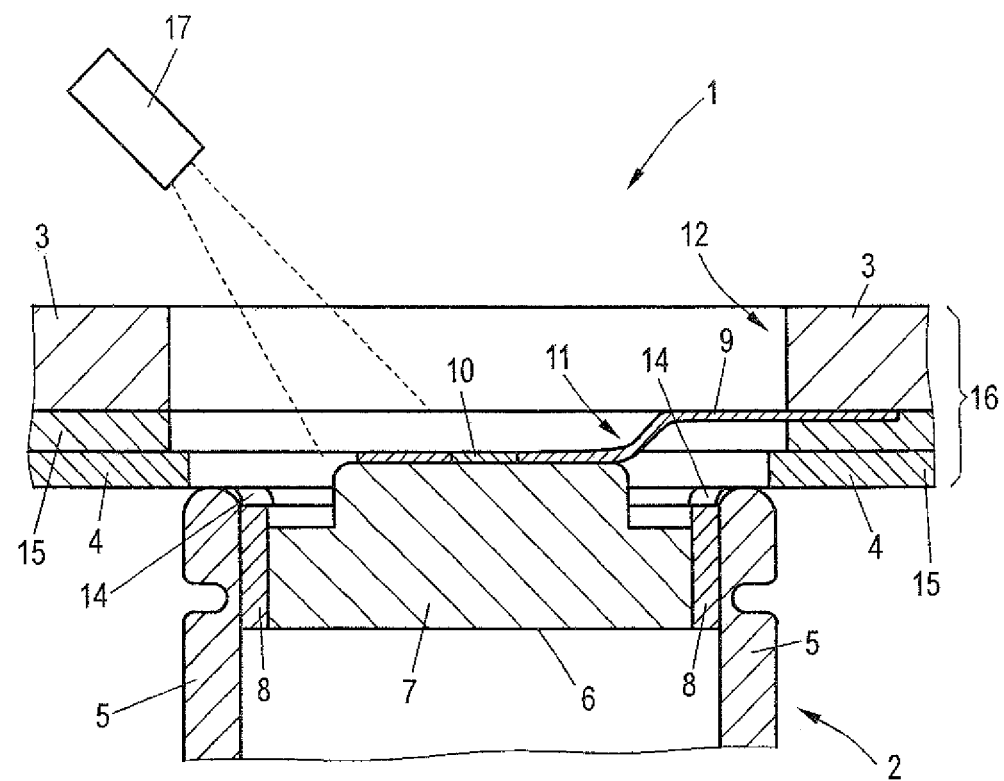
FIG. 2 shows a sectional view of the energy storage arrangement in the end side region of an energy storage.

FIG. 2 shows a section through the energy storage arrangement 1 in the end side region of the middle energy storage 2. Between the first busbar 3 and the second busbar 4 an insulating layer 15 for preventing short circuits is arranged. The first busbar 3, the second busbar 4 and the insulating layer 15 hereby form a current collector 16 which was placed on the energy, storages 2 as connected component for fastening on the energy storages 2.

On the side of the terminal connection the contact section 9 is arranged on the remaining sections of the first busbar 3, wherein the width of its offset 11 determines the distance between the first busbar 3 and the second busbar 4. The offset 11 enables in addition a particularly simple compression of the elastically deformable contact section 9 for generating the welding connection 10. As can be seen the contact section 9 does not contact the housing 5. FIG. 2 also shows two contact elements 14 which are also arranged end side on the remaining sections of the second busbar 4 and overlap the border of the housing at two sites behind the drawing plane.

The recesses 12, 13 enable easy access to the contact section 9 as well as the contact elements 14 by a laser-welding tool during production. Hereby a camera 17 monitors the production for quality control of the generated welding connections on the contact sections 9 and the contact elements 14.

The energy storage arrangement 1 is preferably used for providing electrical energy in a motor vehicle, in particular for supply of a partially or fully electrically operated drive aggregate. Such a use is also conceivable in other land vehicles such as trains but also in air vessels, space vessels or water vehicles. In addition the energy storage arrangement 1 can also be used in stationary scenarios for example as a buffer storage in a building whose low-voltage network can be supplied decentrally.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An energy storage arrangement, comprising:
   multiple energy storages arranged offset to each other, each energy storage having a housing and a terminal connection, said terminal connection lying on an electrostatic potential of a first terminal of the energy storage and being arranged on an end side of the energy storage, said housing lying on an electrostatic potential of a second terminal of the energy storage;
   a first busbar electrically conductively fastened on the terminal connection of each of the energy storages and a separate contact section directly connected to and protruding from the first busbar for each of the terminal connections to be fastened;
   a second busbar electrically conductively fastened on the housing on the end side of the energy arrangement on which the first busbar is arranged, said second busbar extending partially around the energy storages without entirely surrounding the energy storages; and
   an insulating layer directly connected to the contact section and arranged between the first and the second busbar and connecting the first and second busbar so as to form a current collector having a layered configuration,
   wherein the housing of each of the energy storages is configured cup-shaped and has a cover element which includes the terminal connection, said housing being electrically insulated against the terminal connection, said second busbar being fastened on a border region of the housing of each energy storage,
   wherein the second busbar has exactly three contact elements for each individual energy storage for the fastening on the housing of each individual energy storage, said exactly three contact elements at least partially overlapping the border region.

2. The energy storage arrangement of claim 1, wherein the first busbar is fastened on the terminal connections and/or the second busbar is fastened on the housings by means of a welding connection.

3. The energy storage arrangement of claim 1, wherein the contact sections are offset when viewed in cross section.

4. The energy storage arrangement of claim 1, wherein the contact sections are respectively configured as a metal tab having a free end and being fastened at the free end on the terminal connection, said metal tab being elastically deformable so as to enable pressing of the metal tab against the terminal connection.

5. The energy storage arrangement of claim 4, wherein the metal tabs are made of steel or nickel.

6. The energy storage arrangement of claim 1, wherein at least one of the contact elements and the contact sections are made of steel or nickel.

7. The energy storage arrangement of claim 1, wherein the first busbar and/or the second busbar have recesses above the end sides of the energy storages.

8. A motor vehicle, comprising at least one energy storage arrangement said at least one energy storage arrangement comprising multiple energy storages arranged offset to each other, each energy storage having a housing and a terminal connection, said terminal connection lying on an electrostatic potential of a first terminal of the energy storage and being arranged on an end side of the energy storage, said housing lying on an electrostatic potential of a second terminal of the energy storage; a first busbar electrically conductively fastened on the terminal connection of each of the energy storages and a separate contact section directly connected to and protruding from the first busbar for each of the terminal connections to be fastened; a second busbar electrically conductively fastened on the housing on the end side of the energy arrangement on which the first busbar is arranged, said second busbar extending partially around the energy storages without entirely surrounding the energy storages; and an insulating layer directly connected to the contact section and arranged between the first and the second busbar and connecting the first and second busbar so as to form a current collector having a layered configuration, wherein the housing of each of the energy storages is configured cup-shaped and has a cover element which includes the terminal connection, said housing being electrically insulated against the terminal connection, said second busbar being fastened on a border region of the housing of each energy storage, wherein the second busbar has exactly three contact elements for each individual energy storage for the fastening on the housing of each individual energy storage, said exactly three contact elements at least partially overlapping the border region.

9. A method for producing an energy storage arrangement, comprising:
   providing multiple energy storages arranged offset to each other, each energy storage having a housing and a terminal connection, said terminal connection lying on an electrostatic potential of a first terminal of the energy storage and being arranged on an end side of the energy storage, said housing lying on an electrostatic potential of a second terminal of the energy storage;
   fastening a first busbar electrically conductively on the terminal connection of each of the energy storages;
   fastening a second busbar electrically conductively on the housing on the end side of the energy arrangement on which the first busbar is arranged such that the second busbar extends partially around the energy storages without entirely surrounding the energy storages; and
   arranging an insulating layer between the first and the second busbar so as to form a current collector having a layered configuration,
   wherein a separate contact section directly connects to and protrudes from the first busbar for each fastening on the energy storages, said contact regions being fastened on the terminal connections,
   wherein the insulating layer directly connects to the contact section,
   wherein the housing of each of the energy storages is configured cup-shaped and has a cover element which includes the terminal connection, said housing being electrically insulated against the terminal connection, said second busbar being fastened on a border region of the housing of each energy storage, wherein the second busbar has exactly three contact elements for each individual energy storage for the fastening on the housing of each individual energy storage, said exactly three contact elements at least partially overlapping the border region.

10. The method of claim 9, wherein the first busbar is welded to the terminal connections and/or the second busbar is welded to the housings.

11. The method of claim 9, wherein the second busbar is fastened on a border region of each housing, said housing being closed by a cover element which includes the terminal connection and insulates the terminal connection relative to the housing.

12. The method of claim 11, wherein the second bulbar has at least one contact element for the fastening on the housing of each energy storage, wherein the at least one contact element is fastened so as to at least partially overlap the border region.

13. The method of claim 9, wherein the contact sections are configured as elastically deformable metal tabs, said method further comprising pressing the metal tabs against the terminal connections.

14. The method of claim 9, wherein the first busbar and/or the second busbar have recesses in regions that are to be arranged above end surfaces of the energy storages, said method further comprising guiding a tool for the fastening through the recesses for generating the fastening connection.

15. The method of claim 9, further comprising monitoring the energy storage arrangement with a camera for verifying a proper fastening fastening of the first busbar to the terminal connections and/or the second busbar on the housing.

* * * * *